United States Patent [19]

Augason

[11] Patent Number: 4,684,424
[45] Date of Patent: Aug. 4, 1987

[54] METHOD AND APPARATUS FOR MAKING AN OPTICAL ELEMENT HAVING A DIELECTRIC FILM

[75] Inventor: Gordon C. Augason, Sunnyvale, Calif.

[73] Assignee: The United States of America as represented by the Administrator of the National Aeronautics and Space Administration, Washington, D.C.

[21] Appl. No.: 765,981

[22] Filed: Aug. 15, 1985

[51] Int. Cl.$^4$ ............................................. B32B 17/00
[52] U.S. Cl. .................................... 156/163; 156/229; 156/286; 156/382; 156/494; 264/291
[58] Field of Search .............. 156/285, 286, 493, 494, 156/229, 382, 212, 160, 163; 38/102.1, 102.2; 69/19.1; 264/291; 269/21

[56] References Cited

U.S. PATENT DOCUMENTS

| | | | |
|---|---|---|---|
| 2,570,273 | 10/1951 | Pryor | 156/163 X |
| 2,978,008 | 4/1961 | Conti | 156/286 X |
| 3,234,065 | 2/1966 | Best | 156/285 X |
| 3,671,351 | 6/1972 | Ties | 156/285 X |
| 3,964,958 | 6/1976 | Johnston | 156/285 X |
| 4,564,408 | 1/1986 | Crumbach | 156/493 X |

Primary Examiner—David Simmons
Attorney, Agent, or Firm—Darrell C. Brekke; John R. Manning; Robert D. Marchant

[57] ABSTRACT

A film-application device (FAD) comprising a pair of exterior, tapered, "O" ring bearing plate members and a central plate member for simplifying the process of thermally bonding a thin dielectric film to a substrate comprising an optical element. In use, the film is sandwiched between the "O" rings and stretched across the optical element by squeezing the exterior plates together before bonding to the element. The film may be used for protecting the optical element or to reduce surface reflection of radiation.

The FAD may also be used without the center plate to stretch a dielectric film prior to its attachment to or insertion in a holder to make pellicles or beam-splitters.

30 Claims, 3 Drawing Figures

METHOD AND APPARATUS FOR MAKING AN OPTICAL ELEMENT HAVING A DIELECTRIC FILM

ORIGIN OF THE INVENTION

The invention described herein was made by an employee of the United States Government and may be manufactured and used by or for the Government for governmental purposes without the payment of any royalties thereon or therefor.

TECHNICAL FIELD

The present invention relates to a method and apparatus for stretching a thin dielectric film in general and to a method and apparatus for stretching a thin dielectric film for use in covering an optical element in particular.

BACKGROUND ART

Optical elements may be coated with thin dielectric films to protect them and/or to reduce surface reflections. Born, M. and Wolf, E., *Principles of Optics*, p. 51, Pergamon Press, New York (1970. Armstrong, K. R. and Low, F. J., Appl. Opt. 13, 425 (1975), describe a technique (useful for wavelengths greater than 20 $\mu$m) for using thermally-bonded polyethylene and Mylar (Du Pont De Nemours & Co., Wilmington, DE 19898) films as antireflection coatings on the surfaces of transmitting materials. The indices of refraction of polyethylene (n~1.5) and Mylar (n~1.7) make them well-suited for this purpose, and they form thermal bonds with many materials which will survive repeted cryogenic cycling below 4K.

Although these films adhere well to optical elements, it is difficult to obtain a smooth, flawless surface when using them, especially for diameters greater than 1 cm. The imperfections come from wrinkles in the plastic and from residual air bubbles.

Other optical elements comprising a single thin sheet of dielectric film mounted on an annular ring or clamped in a holder, such as a pellicle or beam splitter, must also be free of such imperfections.

STATEMENT OF INVENTION

In view of the foregoing, principal objects of the present invention are a method and apparatus for making an optical element comprising a dielectric film which is free of wrinkles, residual air bubbles and the like.

In accordance with the above objects there is provided in a first embodiment of the present invention a film-application device (FAD) comprising a pair of exterior, tapered plate members, a polished central plate member and a means for squeezing the plate members together.

In each of the exterior plate members there is provided an annular tapered surface extending radially from a shoulder for supporting an elastic "O" ring. In the central plate member there is provided a centrally located hole for receiving an optical element, such as a lens, a filter or a window, and a means for providing a vacuum between films of dielectric material inserted between the central and exterior plate members.

In operation, an optical element is located in the hole in the central plate member and a film of dielectric material is sandwiched between the optical element and each of the "O" ring bearing exterior plate members. The plate members are then squeezed together. As the plate members are squeezed together, the "O" rings roll on the tapered surfaces of the exterior plate members and expand, stretching the dielectric films. A vacuum provided between the dielectric films draws the films against the opposite surfaces of the optical element. An application of heat thermally bonds the dielectric films to the surfaces of the optical element.

In another embodiment of the present invention, an auxiliary film of material having a higher melting point than the film used to coat the optical element is sandwiched between the latter film and each of the "O" ring bearing exterior plate members. For example, if the coating film is polyethelene, the auxiliary film may be a film such as Mylar.

In practice, the auxiliary film is used for catching the optical element and residue of the coating material after the coating is applied in such a manner as not to disturb the coating.

In still another embodiment of the present invention, the central plate member may be omitted.

In the latter embodiment, the exterior "O" ring bearing plate members are squeezed together for stretching a single sheet of dielectric material for subsequent bonding to an annular ring to make a pellicle or beam splitter. Alternatively, the stretched dielectric is clamped in a holder before the plates are released.

BRIEF DESCRIPTION OF DRAWINGS

The above and other objects, features and advantages of the present invention will become apparent from the following detailed description of the accompanying drawings, in which.

DETAILED DESCRIPTION OF THE INVENTION

Figure 1:
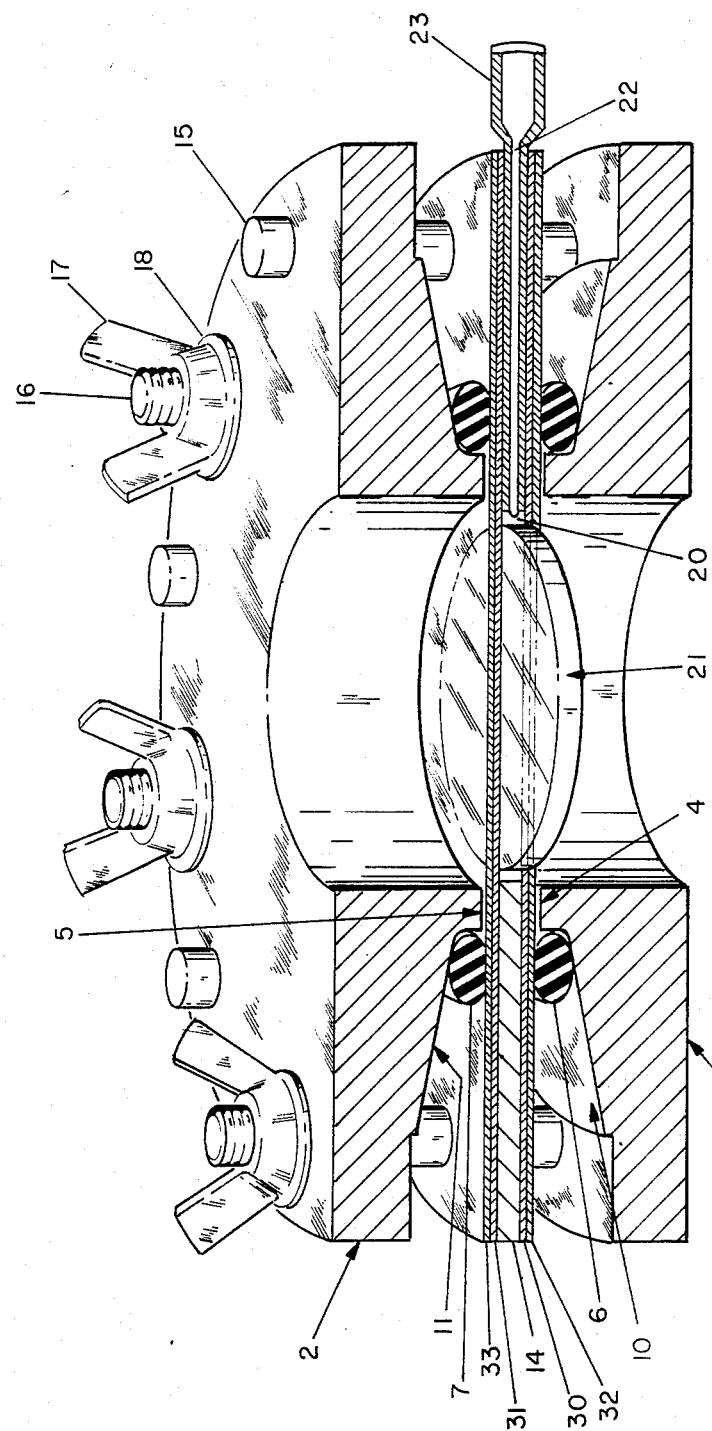
FIG. 1 is a partial cross-sectional view of an embodiment of an apparatus according to the present invention.
Figure 2:
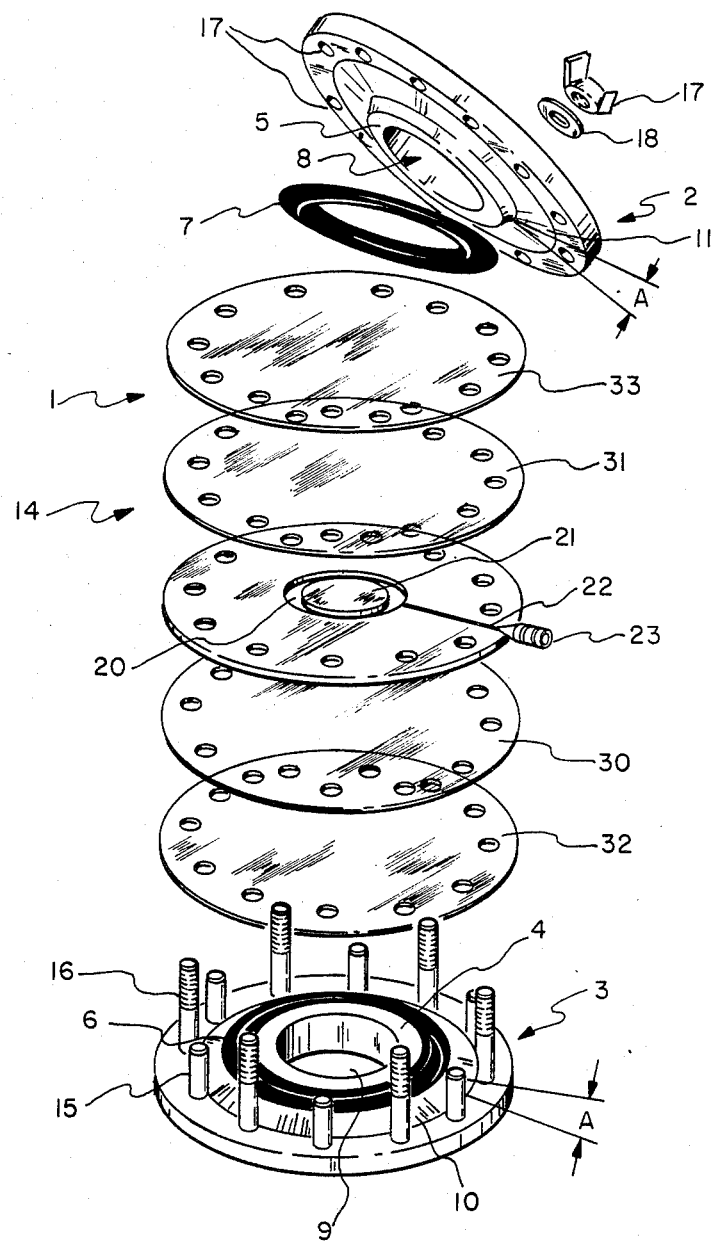
FIG. 2 is an exploded view of the apparatus of FIG. 1.

Referring to FIGS. 1 and 2, there is provided in accordance with the present invention a film stretching apparatus designated generally as 1. In the apparatus 1 there is provided first and second exterior plate members 2 and 3 and a polished central plate member 14.

In the first and second plate members 2 and 3 there is provided a pair of annular shoulders 4 and 5 about which is fitted a pair of elastic "O" ring members 6 and 7, respectively. Centrally located in the plate members 2 and 3 there is provided a pair of holes 8 and 9, respectively. Beneath the "O" rings 6 and 7 and extending radially from the shoulders 4 and 5 there is provided a pair of tapered surfaces 10 and 11, respectively. The surfaces 10 and 11 have a typical taper A of about 10°. Each of the "O" rings 6 and 7 projects beyond its shoulder so that it contacts the material to be stretched. At the base of the tapered surface 10 there is provided a circle of alternating pins 15 and bolts 16. In the plate member 2 there is provided a plurality of holes 17 for receiving the pins 15 and bolts 16. A wing nut 17 and washer 18 are provided for each of the bolts 16.

The central plate 14 is provided with a hole 20 for receiving a substrate comprising an optical element 21, such as a lens, a filter or a window, and is provided to be approximately the same thickness as the element to be coated. A hypodermic needle 22 having a coupling 23 is soldered in a groove provided therefor in the plate 14. The plate 14 is polished so that the expanding "O" rings may stretch the dielectric film across it.

Any dielectric film may be used to make the coatings, but thin polyethylene is particularly useful for this application because it is readily available and its melting point is lower than Mylar. Also, it does not stick to Mylar unless heated beyond its melting point. This last point is important because, as explained below, in the coating process, the element to be coated is placed between two sheets of polyethylene which are placed between two sheets of Mylar. While the polyethylene sheets contain a vacuum created therebetween, the Mylar is used to hold the polyethylene sheets against the element to be coated and to hold the element in place while it is heated to a temperature slightly below the melting point of polyethylene for approximately one hour until the thermal bond is made. If the temperature is too low, the polyethylene will not stick. If the temperature is too high, the polyethylene coating will be too thin and it will stick to the Mylar. Polyethylene comes in many densities, both annealed and unannealed. The annealed polyethylene (approximately 0.13 mm thick) that is generally available as kitchen wrap seems to make the best bond. If greater thickness is required to give the optimum antireflection characteristics, several layers may be applied, one layer at a time.

To use the FAD to apply films, holes corresponding to the circular bolt and pin pattern are melted in the sheets 30-33 of the dielectric materials using a soldering iron and a template. Then a sheet 32 of Mylar is placed over the "O" ring 6 on the plate 3 and a sheet 30 of polyethylene is placed over the Mylar. The central plate 14 is then placed over the polyethylene 30. The element 20 to be coated is placed in the center hole 20. After this, a sheet 31 of polyethylene is placed over the element 20 to be coated and a sheet 33 of Mylar is placed over the polyethylene. Finally, the top plate 2 with its "O" ring 7 is placed on the stack and the wing nuts 17 are tightened carefully causing the "O" rings 6 and 7 to roll outwardly due to the tapered surfaces 10 and 11. As the plates 2 and 3 are squeezed together, the films are observed through holes 8 and 9 to insure that they are being stretched evenly and that all wrinkles and air bubbles are removed. Pressing on the films through the holes 8 and 9 facilitates this process. The wing nuts 17 should not be tightened excessively. The films will slide better on the central plate if a dry lubricant like Miller-Stephenson MS-122 (Miller-Stephenson Chemical Co. Inc., Danbury, CT 06810) is used before each coating application. Also, the "O" rings 6, 7 should be made of a material that does not deform when heated. Silicone compounds are recommended; neoprene compounds have too low a melting point and nitrile and butyl compounds are marginal for this application (Parker Seal Co., Lexington, KY 40512).

Next, the assembled FAD is placed in an oven and the FAD is evacuated. Then the temperature is raised to the required level which for polyethylene is approximately 73° C. After approximately one hour the thermal bond will have been made and the vacuum and the oven are turned off. After the FAD is allowed to cool it is disassembled and the Mylar is peeled off the coated element. If the temperature was correct, the edges of the coated element will press through the soft heated polyethylene and little trimming will be required. If more than one layer of polyethylene is required, each subsequent layer seems to reduce the flaws of the previous layers. If Mylar is to be used as the coating material, some other plastic must be found for the outer layer of the stack which has a higher melting point than Mylar.

In an alternative embodiment of the present invention, the central plate 14 is omitted and a film comprising a single sheet of dielectric material is stretched between the plates 2 and 3. When all wrinkles have been removed from the sheet, a ring-shaped member or holder is inserted in one or both of the holes 8 and 9 of the plates 2 and 3. The sheet is then bonded to the ring-shaped member or clamped in the holder, as the case may be. Thereafter, the plates 2 and 3 are released.

In practice, the latter embodiment of the invention may be used for making a pellical or beam splitter which has many applications.

Figure 3:
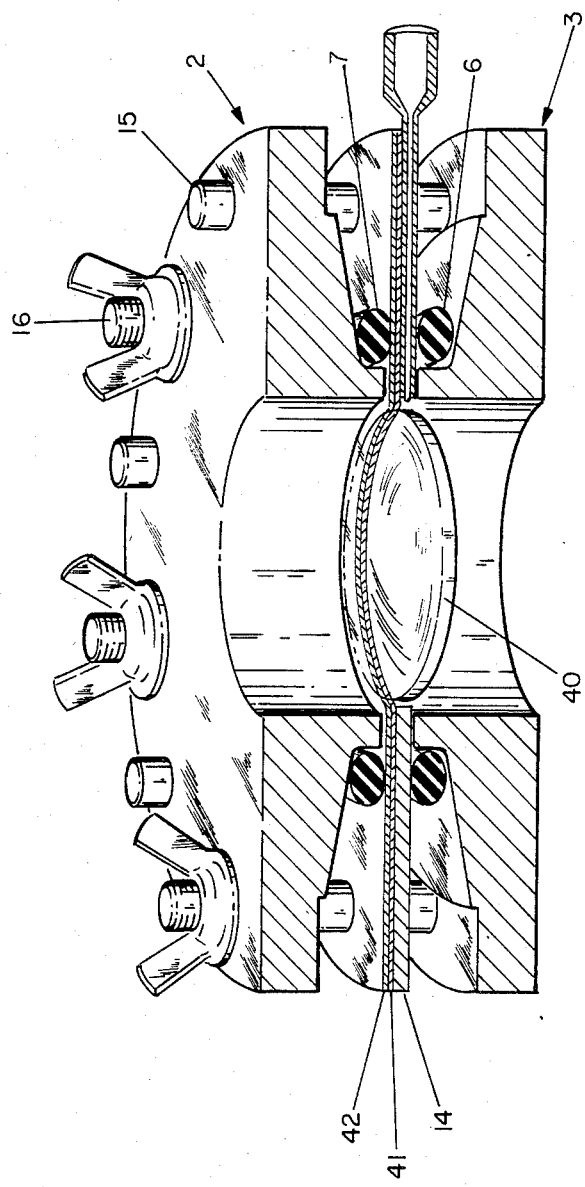
FIG. 3 is a partial cross-sectional view of an embodiment of an apparatus according to the present invention showing use of the invention for coating an element comprising a conic section.

Referring to FIG. 3, the apparatus of FIGS. 1 and 2 may also be used for coating a conically shaped element 40, such as a plano- or bi-convex lens. As shown in FIG. 3, the lens 40 is inserted through the hole 10 in the plate 3 and held against dielectric films 41 and 42 causing the films 41 and 42 to drape over the convex surface of the lens 40 while the films 41 and 42 are constrained between the facing surfaces of the shoulders 4 and 5. In this embodiment, the lower films corresponding to films 30, 32 of FIGS. 1 and 2 may either be omitted or retained as desired.

While several embodiments of the present invention are described above, it is contemplated that various modifications may be made thereto without departing from the spirit and scope thereof. Accordingly, it is intended that the embodiments described be considered only as illustrative of the invention and that the scope thereof be determined by reference to the claims hereinafter provided.

What is claimed is:

1. A method of making an optical element having a dielectric film comprising the steps of:
   sandwiching said film between a first and a second elastic "O" ring; and
   simultaneously radially expanding all parts of said first and second "O" rings to a larger diameter with said film sandwiched therebetween and stretching said film.

2. A method according to claim 1 wherein said sandwiching step comprises the step of sandwiching said "O" rings between a pair of annular tapered surfaces and said expanding step comprises the step of squeezing said tapered surfaces together whereby said "O" rings are rolled along said tapered surfaces, respectively.

3. A method according to claim 1 wherein each of said first and said second "O" rings lies in a plane and said sandwiching step comprises the step of placing each of said "O" rings in contact with an annular surface having an acute angle relative to the plane of said "O" ring.

4. A method according to claim 1 comprising the step of attaching said film while it is stretched to the surface of a substrate.

5. A method according to claim 4 wherein said attaching step comprises the step of thermally bonding said film to said surface of said substrate.

6. A method according to claim 4 wherein said attaching step comprises the step of clamping said film in a holder for holding said film in a stretched condition.

7. A method of making an optical element having a dielectric film comprising the steps of:
sandwiching said film between a first and a second "O" ring;
simultaneously radially expanding all parts of said "O" rings to a larger diameter with said film sandwiched therebetween and stretching said film; and
attaching said film to a substrate while said film is stretched across the surface of said substrate.

8. A method according to claim 7 wherein said sandwiching step comprises the step of sandwiching said first and said second "O" rings between a pair of annular tapered surfaces and said expanding step comprises the step of squeezing said tapered surfaces together whereby said "O" rings roll outwardly along said tapered surfaces, respectively.

9. A method according to claim 8 wherein each of said first and said second "O" rings lies in a plane and said sandwiching step comprises the step of placing each of said "O" rings in contact with an annular surface having approximately a ten degree taper relative to the plane of said "O" ring.

10. A method according to claim 7 wherein said film comprises a first and a second film, said sandwiching step comprises the step of sandwiching said first and said second films between said first and said second "O" rings and sandwiching said substrate between said first and said second films, said expanding step comprises the step of expanding said first and said second "O" rings for stretching said first and said second films, and said attaching step comprises the step of attaching said first film to a first surface of said substrate and said second film to a second surface of said substrate.

11. A method according to claim 10 wherein said attaching step comprises the step of heating said substrate and said first and second films for thermally bonding said films to said surfaces of said substrate.

12. A method according to claim 10 wherein said sandwiching step comprises the steps of:
sandwiching an annular plate having a centrally located hole therein between said first and said second films; and
placing said substrate in said hole with said first and said second surfaces of said substrate facing said first and said second films, respectively.

13. A method according to claim 10 wherein said sandwiching step comprises the step of creating a vacuum between said first and said second films for drawing said films into contact with said first and said second surfaces of said substrate, respectively, and said attaching step comprises the steps of thermally bonding said first and second films to said first and said second surfaces.

14. A method according to claim 10 wherein said sandwiching steps comprise the steps of:
sandwiching a third film between said first "O" ring and said first film;
sandwiching a fourth film between said second "O" ring and said second film, said third and said fourth films having a higher melting point than said first and said second films;
sandwiching an annular plate having a centrally located hole therein between said first and said second films; and
placing said substrate in said hole with said first and said second surfaces of said substrate facing said first and said second films, respectively.

15. A method according to claim 14 wherein said sandwiching steps comprise the step of creating a vacuum between said first and said second films for drawing said films into contact with said first and said second surfaces of said substrate, respectively, and said attaching step comprises the steps of thermally bonding said first and second films to said first and said second surfaces.

16. An apparatus for making an optical element having a dielectric film comprising:
means for sandwiching said film between a first and a second elastic "O" ring; and
means for radially expanding all parts of said first and said second "O" rings to a larger diameter with said film sandwiched therebetween and stretching said film.

17. An apparatus according to claim 16 wherein said sandwiching means comprises means for sandwiching said "O" rings between a pair of annular tapered surfaces and said expanding means comprises means for squeezing said tapered surfaces together and rolling said "O" rings along said annular tapered surfaces, respectively.

18. An apparatus according to claim 16 wherein each of said first and second "O" rings lies in a plane and each annular surface has approximately a ten degree taper relative to the plane of its respective "O" ring.

19. An apparatus according to claim 16 comprising means for attaching said film while it is stretched to the surface of a substrate.

20. An apparatus according to claim 19 wherein said attaching means comprises means for thermally bonding said film to said surface of said substrate.

21. An apparatus according to claim 16 comprising means for clamping said film in a holder for holding said film in a stretched condition.

22. An apparatus for making an optical element having a dielectric film comprising:
means for sandwiching said film between a first and a second "O" ring; and
means for radially expanding all parts of said "O" rings to a larger diameter with said film sandwiched therebetween and stretching said film across the surface of a substrate.

23. An apparatus according to claim 22 wherein said sandwiching means comprises means for sandwiching said first and said second "O" rings between a pair of annular tapered surfaces and said expanding means comprises means for squeezing said tapered surfaces together for rolling said "O" rings along said tapered surfaces, respectively, and stretching said film across the surface of said substrate.

24. An apparatus according to claim 23 wherein each of said first and said second "O" rings lies in a plane and each annular surface has approximately a ten degree taper relative to the plane of its respective "O" ring.

25. An apparatus according to claim 22 wherein said film comprises a first and a second film, said sandwiching means comprises means for sandwiching said first and said second films between said first and said second "O" rings and sandwiching said substrate between said first and said second films, said expanding means comprises means for expanding said first and said second "O" rings for stretching said first and said second films, and said attaching means comprises means for attaching said first film to a first surface of said substrate and said second film to a second surface of said substrate.

26. An apparatus according to claim 25 wherein said attaching means comprises means for heating said substrate and said first and second films for thermally bonding said films to said surfaces of said substrate.

27. An apparatus according to claim 25 wherein said sandwiching means comprises:
means for sandwiching an annular plate having a centrally located hole therein between said first and said second films; and
means for placing said substrate in said hole with said first and said second surfaces of said substrate facing said first and said second films, respectively.

28. An apparatus according to claim 25 wherein said sandwiching means comprises means for creating a vacuum between said first and said second films for drawing said films into contact with said first and said second surfaces of said substrate, respectively, and said attaching means comprises means for thermally bonding said first and second films to said first and said second surfaces.

29. An apparatus according to claim 25 wherein said sandwiching means comprises:
means for sandwiching a third film between said first "O" ring and said first film;
means for sandwiching a fourth film between said second "O" ring and said second film, said third and said fourth films having a higher melting point than said first and said second films; and
means for sandwiching an annular plate having a centrally located hole therein between said first and said second films, said hole being provided for receiving said substrate.

30. An apparatus according to claim 29 wherein said sandwiching means comprises means for creating a vacuum between said first and said second films for drawing said films into contact with said first and said second surfaces of said substrate, respectively, and said attaching means comprises means for thermally bonding said first and second films to said first and said second surfaces.

* * * * *